Nov. 12, 1946.   H. L. PITT   2,411,107
AIRCRAFT CONTROL SURFACE
Filed Aug. 27, 1943   3 Sheets-Sheet 1
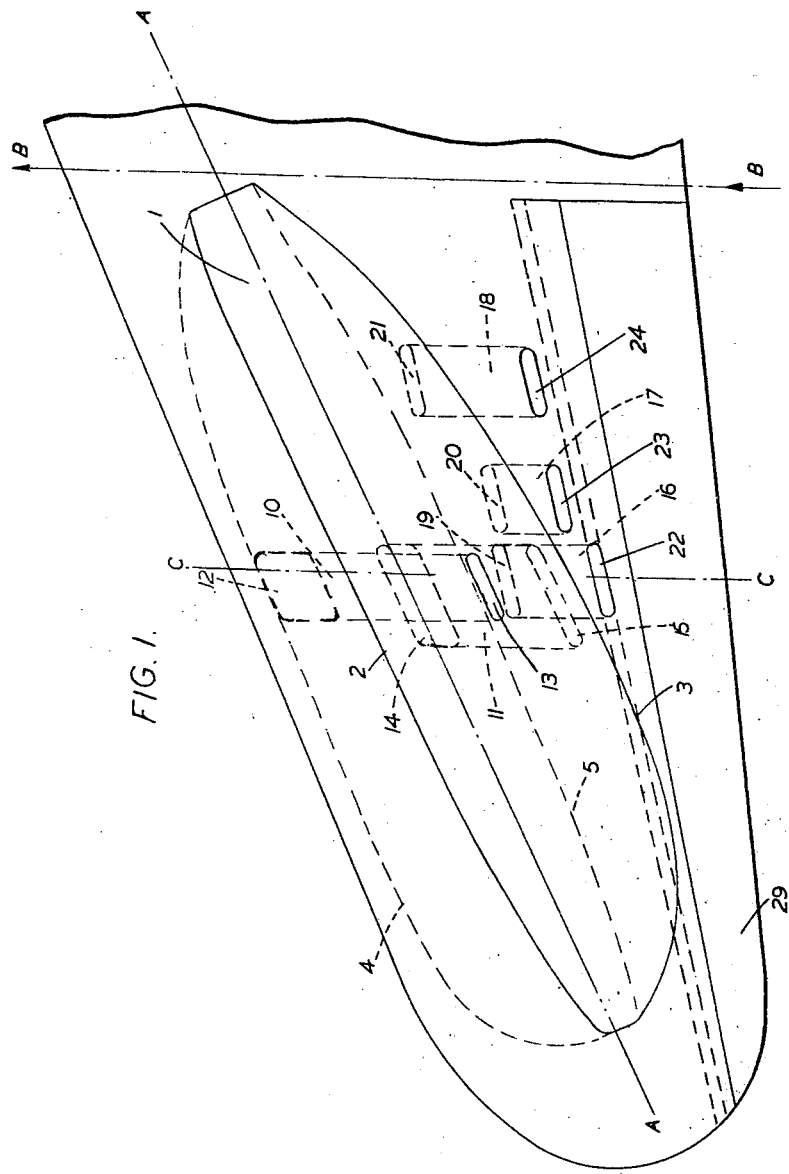
FIG. I.
Inventor
HUBERT LEWELLEN PITT
By
Attorney

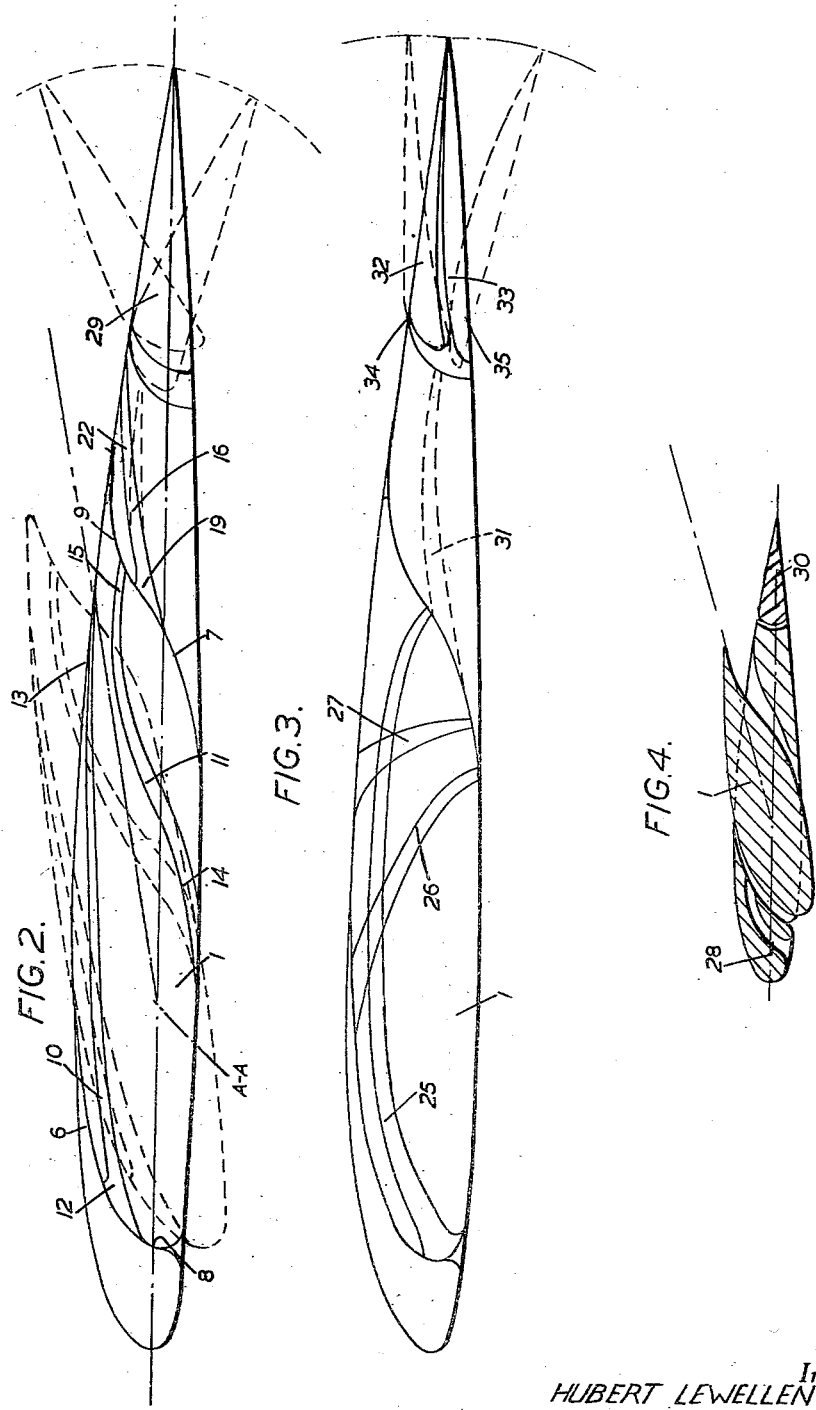

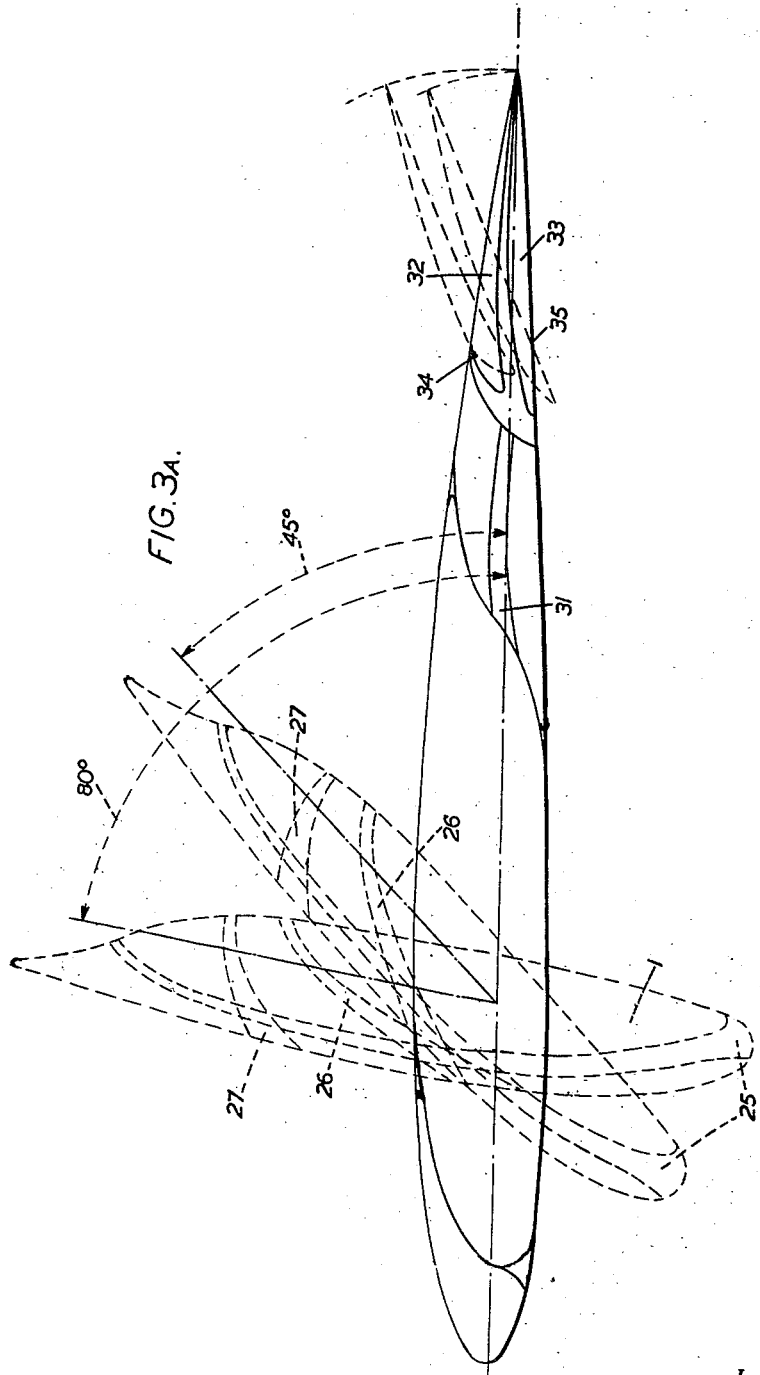

Patented Nov. 12, 1946

2,411,107

UNITED STATES PATENT OFFICE 2,411,107

AIRCRAFT CONTROL SURFACE

Hubert Lewellen Pitt, Bromley, England

Application August 27, 1943, Serial No. 500,195
In Great Britain July 3, 1942

20 Claims. (Cl. 244—42)

The object of this invention is to improve or modify the aeroplane described and claimed in the specification of my Patent No. 2,111,481, that is to say, an aeroplane of the type comprising control surfaces each of which is not greater in area than half the area of the wing and is mounted in an orifice formed in the wing between the leading and trailing edges of the latter, the control surface being solid in construction and adapted to be turned relatively to said orifice on an axis which is directed forwardly and inclined to the longitudinal axis of the aircraft at an angle which is less than 90° to said axis, said control surface also being so constructed and arranged that when turned from its inoperative position, its leading edge projects downwards and forwards towards the leading edge of the wing whilst its trailing edge projects rearwards and upwards, whereby air from the underside of the wing is caused to flow both over the top surface and over the under side of the control surface rearwards or mainly rearwards and upwards through the orifice in the wing, thereby causing either a destruction of lift, pressure loss at the wing tip and negative pressure, or an increase of lift, according to the degree of opening of the orifice by the control surface and the relative velocity of the airstream caused to flow through the orifice and past the control surface, and thereby effecting a redistribution of pressure between the lower and upper wing surfaces through the orifice in which the control surface is disposed. The said control surfaces will be termed "control-stabilisers" in the following description.

The above statement to the effect that the control stabiliser is solid in construction means that the stabiliser is not constructed to fill up with air.

According to the present invention, I provide an aeroplane of the type referred to, wherein one or more slots is or are formed in each control stabiliser and (or) one or more slots is or are formed in the part of the wing adjacent to, and in front of and (or) behind, the orifice in which the stabiliser is turnable, each of said slots being adapted to permit the flow of air through the slot from below to above the wing when the stabiliser is turned out of its position in which it acts to close the orifice in the wing.

The disposition and arrangement of the slots in the stabilisers and (or) in the wings and the arrangement of the stabilisers and the orifices in which they are turnable may be such that air flow through the slots commences immediately the stabilisers are opened, the full flow of the air through the slots taking place after the stabilisers have been opened to a predetermined degree, or the airflow may be deferred until the stabilisers have been opened to a predetermined extent from their closed position.

One of the principal objects of the use of all forms of my control stabiliser is to provide means for controlling the airflow over the wing tip so that (a) movements of the centre of pressure about the wing tip and wing as a whole provide stability, control and damping about all axes particularly of a nonskilled nature (b) either an increase of maximum lift or an increase of the angle at which maximum $C_L$ occurs or both or a flattening of the top of the lift curve, i. e., increasing the lift beyond the angle of maximum lift so that the amount of lift at angles beyond this point is reduced gradually, if at all, and/or practical and useful lift is prolonged through a larger number of degrees (c) to improve the airflow over trailing edge flaps which may be used in conjunction with the stabilisers, and (d) to increase drag at high angles of attack as well as lift or to increase drag still more at large openings of the control stabiliser. Thus, it will readily be appreciated that with the stabiliser formed with slots according to the present invention a variety of means of achieving the above object are available in considering all the aerodynamic factors and requirements of the aircraft as a whole. The use of such slots, their number, or their complete omission will depend upon the performance and behaviour characteristics required of the aircraft and the degree of aerodynamic and structural complexity or simplicity decided upon accoring to the utility of the design. It will be readily appreciated by those skilled in the art that such slots will be placed where tests reveal their need in controlling the flow over the upper surface at various angles and that such variation of position and form will be suited to the type of wing tip in particular and the type of aircraft in general and the performance characteristics required of it. Generally speaking, however, the multiplicity of slots in the control stabiliser and wing will offer a wider choice and control of, centre of pressure movements and of the airflow over the top surface as well as tending to achieve the above mentioned objects (b) and (c) to a greater extent.

Thus, the arrangement may be such that, when the stabiliser is opened to a pre-determined extent, one or more slots in the stabiliser permit the full flow of air from the neighbourhood of the lower surface of the stabiliser through the latter to the upper surface thereof, and this slot or these slots may be employed in association with another or other slots in the stabiliser which permit the flow of air from the lower surface of the satbiliser through the latter to the neighbourhood of the upper surface thereof. Again, one or more slots may be provided in the wing to permit the flow of air from the neighbourhood of the bottom surface of the wing to the upper surface of the wing, and this slot or these slots may be used alone or in combination with one or more slots disposed in the stabiliser as mentioned above and they may be arranged in the front and (or) rear part of the wing adjacent to the stabiliser.

The control stabiliser may be formed with one or more slots having their front or inlet ends formed in front of the stabiliser, so that they are covered when the stabiliser is closed, and their rear or outlet ends permanently open in the top surface of the stabiliser. On the other hand, the control stabiliser may be, or may also be, formed with one or more other slots, the front or inlet ends of which are permanently open in the undersurface of the stabiliser, while their rear or outlet ends are covered when the stabiliser is closed.

The front inlet end of a slot in the wing may be formed in the rear wall of said orifice, its permanently-open outlet end being formed in the upper surface of the wing at the rear of said orifice. The wing may be, or may also be, formed with at least one slot having its outlet (or inlet) end in the front wall of said orifice, and thus adapted to be covered when the stabiliser is closed, and its inlet (or outlet) end permanently open in the bottom or top surface of the wing in front of said orifice.

Constructional forms of the invntion, as applied to one of the control stabilisers of a tailless aeroplane with sweptback wings, are hereinafter described, by way of example, with reference to the accompanying drawings, whereon:

Fig. 1 is a plan view of the tip end of a wing provided with a slotted control stabiliser;

Fig. 2 is a section on the line C—C in Fig. 1;

Fig. 3 is a section through a wing provided with a control stabiliser having a modified arrangement of slots;

Fig. 3A is a view corresponding to Fig. 3, but showing the control stabiliser when turned into two different open positions; and Fig. 4 is a section through a wing provided with a single slot only in the leading edge of the wing in front of the control stabiliser.

Referring to the drawings, Fig. 1 shows, in fragmentary plan view, the wing top end of a swept-back wing fitted to an aeroplane of the tailless type. In this construction, the control stabiliser 1 is arranged to turn with its leading edge downwardly and its trailing edge upwardly, see Fig. 2, about an axis A—A which is arranged at an angle of about 64° to the datum line of flight B—B. As shown in Figure 1, the front and rear top edges 2 and 3 of the orifice in the wing in which the stabiliser is turnable are nearer to the trailing edge of the wing respectively than the front and rear edges 4 and 5.

The front wall 6 of the orifice is curved rearwardly and upwardly from bottom to top as shown in Fig. 2, and the rear wall 7 is formed with a double curve extending rearwardly and upwardly. The front and rear edges 8 and 9 of the control-stabiliser are shaped to fit accurately in the front and rear walls 6 and 7 of said orifice when the stabiliser is closed, in which position the top and bottom surfaces of the stabiliser are faired with the top and bottom surfaces of the wing as shown in Fig. 2.

In this particular construction, two slots are formed in the control-stabiliser, the front slot 10 being disposed on one side of the axis A—A about which the stabiliser is turnable and the rear slot 11 on the other side thereof. Considered when the stabiliser is closed, see Fig. 2, the inlet end 12 of the front slot 10 is disposed at about one-half of the depth of the section of the wing at the position of the inlet measured from the bottom surface of the wing. The inlet end is closed by the front wall 6 of the orifice in the wing. The slot is slightly curved and extends upwards and rearwardly through the control-stabiliser, its outlet end 13 being permanently open and formed in the top surface of the stabiliser and disposed at a spaced distance from the front wall of the said orifice.

The inlet end 14 of the rear slot is formed in the bottom surface of the control-stabiliser and is permanently open, see Fig. 2. This slot curves upwardly and rearwardly and its outlet end 15, which is formed in the rear wall 9 of the control-stabiliser, is masked by the rear wall 7 of the orifice when the stabiliser is closed.

This construction is such that the air flow through both slots commences when the control stabiliser is turned, but the full air flow is prevented until the control stabiliser has been turned through a pre-determined angle, say approximately 10 degrees. For instance, at this angle the rear slot 11 has its outlet end 15 well unmasked whereas full unmasking of the inlet end 12 of the front slot 10 is just beginning, see Fig. 2.

In the construction now being described, in Figs. 1 and 2, three span-wise spaced slots 16, 17 and 18 are also formed in the wing, one of these (the slot 16) being shown in section in Fig. 2. The inlet ends 19, 20 and 21 of these slots are formed in the rear wall 7 of the orifice in the wing. The slots slope upwardly and rearwardly and their outlet ends 22, 23 and 24, which are permanently open, are formed in the top surface of the wing at the rear of the rear wall 7 of said orifice. The inlet ends of the slots in the wing are arranged to be progressively uncovered as the stabiliser moves through a predetermined angle, according to their positioning.

Fig. 2 shows in broken lines the position of the stabiliser 1 after it has been turned about its axis through the said predetermined angle in which the full airflow takes place through the slots in the wing, whilst further opening will progressively increase the volume of flow which is already flowing through the inlet 14 in the slot 11 of the control stabiliser.

It will be understood that the stabiliser could be provided with one slot (front or rear) only and that a slot need not be provided in the wing. On the other hand, there might be a slot or slots in the wing (forward and (or) aft of the said orifice) while no slots need be formed in the stabiliser. Further, there might be a plurality of slots in the stabiliser and one or more or no slots in the wing.

For instance, Fig. 3 shows a stabiliser 1 provided with an alternative series of slots 25, 26 and 27 designed to control, divert, distribute or influence the flow at large openings of the control staliser wherein the inlet ends of the slots come into operation approximately in sequence as the control stabiliser is progressively opened to 90°.

Fig. 4, on the other hand, illustrates one method of using one slot 28 only in the leading edge of the wing, which becomes effective as soon as its outlet end is unmasked in the first few degrees of opening of the control stabiliser 1. This figure is cross hatched to show more clearly the slot 28 in operation when the stabiliser has been moved approximately 10° from its closed position.

When a plurality of slots is used in the stabiliser, these may consist of a single slot, or a row of slots spaced span-wise, having its, or their, inlet end, or ends, arranged near to the lower surface of the stabiliser and another single slot, or another row of slots spaced span-wise, with its, or their, inlet end or ends arranged above the inlet end, or ends, of the first mentioned slot, or slots, and so on. The slots in the rows may be arranged directly above each other or in staggered formation. The same remarks apply to the slots in the wing and to those slots whose inlet ends are formed in the lower surface of the stabiliser, except that in the latter case the single slots or the rows of slots might be spaced in the direction of the chord as well as span-wise.

If the inlet ends of the slots in the front of the stabiliser and in the wing and the outlet ends of the slots in the rear face of the stabiliser are arranged at different levels the number of slots which will become effective will obviously depend upon the degree of opening of the stabiliser.

Although reference has been made to "slot" or "slots" as individual entities it will be understood that should it be required any slot or slots may be connected by passageways or other means of distribution.

Although trailing edge flaps form no part of the present invention, it should be mentioned that the slotted control stabilisers of this invention may be used in association with them as shown in the drawings. Trailing edge flaps 29 and 30 of different types are shown respectively in Figs. 1, 2 and 4. One of the principal objects of the use of the control stabiliser with various forms of trailing edge flap is to change the nature of the flow over the latter at various angles of attack of the wing and to provide not only variation in the lift/drag ratio but movements of the mean aerodynamic centre to give trim, control and stability especially at steep angles of descent. When the control stabiliser is opened at maximum angles, the effect in general is to break up the flow over the flap so that the control stabiliser takes over control and stability about all axes from the flaps but in cases where the general compromise of the design necessitates, for instance, a tail-down pitching moment, or an increase thereof, or a decrease in the nose-down pitching moment at particular angles of attack such slots as the slots 26, 26 and 27 illustrated in Figs. 3 and 3A, or similar arrangements may be used to divert the flow from the high pressure region in front of the control stabiliser and under the leading edge of the wing to the lower pressure region behind the control stabiliser when the latter is opened to the maximum or approximately 45° to 90° and so to divert the flow on to the upper portion of the gap and/or conversely to decrease the volume of flow allowed to reach the under portion thereof.

Figures 3 and 3A show this form of control stabiliser in combination with a slot 31 through the rear wall of the wing orifice running to a split type of flap 32, 33, the upper part 32 being adapted to turn about an axis 34 and the lower part 33 about an axis 35. It will be appreciated that the volume of air flow permitted through the slot 31 to the split flaps 32 and 33 will be affected by the extent to which the type of slotted stabiliser shown in the figures is used but, of course, such a stabiliser could be used with alternative type of flaps and designed accordingly.

It will be appreciated that the invention is applicable to aeroplanes of the type referred to which have either one or a plurality of control stabilisers located towards the tip end of the wing. It will also be appreciated that the mechanism for operating the control stabilisers may cause them to be operated independently or simultaneously. They may also be operated differentially, that is to say, the movement of the stabiliser or stabilisers at one end of the wing or in one of the wings may be greater than that of the stabiliser or stabilisers at the other end of the wing or in the other wing.

Reference is made above to the control surface not being greater in area than half the area of the wing. In the case of a continuous wing not interrupted by the fuselage, the expression "half the area of the wing," means that portion of the wing projecting outwards, on the port or starboard side as the case may be, beyond the adjacent outer surface or the level of the adjacent outer surface of the fuselage.

The term "aeroplane" is of course intended to cover non-power driven and power-driven gliders and although the invention has been specifically described above with reference to an aeroplane of the tail-less type, to which the invention is particularly applicable, it is also applicable to aeroplanes having tails and to aeroplanes having the normal controls, viz., ailerons, elevators and rudders and also to continuous, non-interrupted wings. The invention will be capable of development as a means of steepening the glide and increasing the take-off lift of heavy bombing or transport aircraft, and in particular it will lend itself to the improvement in the control, stability, gliding and climbing angle of seaplanes of the central hull or flying boat type, which would thus be able to dispense with the usual tail and control surfaces. The invention will also be found to be of considerable importance in the stabilising of model aeroplanes and gliders, keeping them on an even keel and ensuring efficient directional, longitudinal and lateral control.

By the use of the stabilisers, the aeroplane is enabled to descend and ascend at much steeper angles, thus enabling the use of smaller air fields. When the stabilisers are moved in unison, the rear portions of the wing structure are caused to descend, thus increasing the sinking speed so as to enable the true angle of descent or glide to be varied without danger of stalling. At the same time, the drag in the air is increased so as substantially to decrease the landing speed. In addition, increased control of the angle of attack and the landing speed are afforded for enabling the aeroplane to be set down properly without undesirable results.

When the stabilisers are operated independently of each other, banking can of course be effected to advantage. In a turn and bank, there will be loss of lift, increased drag, turning moment, and down pressure on the control surface, all acting on the inner wing only. This gives more complete control of rolling operations and makes for safety of the aeroplane.

It will be understood that in many situations the slots through the structure comprising the wings and the stabilisers desirably compromise the action of the wings and stabilizers. By a wise selection of the number and position of the slots, with respect to the amount of air flow permitted through them, and with respect to the times at which they should be brought into action as controlled by the unmasking effect of the stabilisers, highly advantageous results may be attained.

By the use of the slots, I am enabled to obtain the required pressure distribution. By the use of the slots, the lift of the wings can be varied without changing their angular positions so as to make available highly effective lifting for take-off and for climbing without being subject to the necessity for employing such high lift at all times. By opening both stabilisers for a controlled flow of air through the orifices and through one or more of the slots, the aeroplane can be put into condition for safe and stable flying for bad weather conditions or for very low speed flying.

I claim:

1. Means for controlling an aeroplane in flight, comprising in combination, wing delineating structure, control stabilisers for said wing each of which is not greater in area than half the area of the wing including the stabilizer at one side of the aeroplane and is mounted in an orifice formed in the wing between the leading and trailing edges of the latter, the control stabiliser being solid in construction and adapted to be turned relatively to said orifice on an axis which is directed forwardly and inclined to the longitudinal axis of the aircraft at an angle which is less than 90° to the last said axis, said turning axis being arranged between the leading and trailing edges of the stabiliser so that when the latter is turned from its inoperative position, in which it is faired with the upper and lower surfaces of the wing, into operative positions, its leading edge projects downwards below the lower surface and forwards towards the leading edge of the wing whilst its trailing edge projects upwards above the upper surface of the wing and rearwards whereby air from the underside of the wing is caused to flow both over the top surface and over the underside of the stabiliser at least mainly rearwards and upwards through the orifice in the wing, the structure comprising the wings and the stabilisers being provided with at least one slot therethrough of small size as compared with the size of the stabiliser and arranged so that in the inoperative position of the stabiliser the slot is closed by the stabilizer and that when the stabiliser is turned to its operative position one end of said slot is unmasked so that a jet of air can flow through said slot from beneath said wing to a position above said wing, said slot being sufficiently small that less air can flow through the slot than through said orifice around said stabiliser.

2. A structure of the type described in claim 1 in which the slot specified is formed in one of the stabilisers.

3. A structure of the type described in claim 1 in which the slot specified is formed in the wing structure.

4. A structure of the type described in claim 1 in which there are at least two slots of the type specified comprising at least one through the wing structure and at least one through a stabiliser.

5. A structure of the type described in claim 1 in which there are at least two slots of the type specified and arranged so that upon a turning movement of the stabiliser the end of one of said slots is substantially completely unmasked at about the time when the substantial unmasking of the other slot begins.

6. A structure of the type described in claim 1 in which there are at least two slots of the type specified with the ends of the slots which are masked by the stabiliser arranged at different levels so that the slots will become effective successively for the pasasge of air therethrough.

7. A structure of the type described in claim 1 in which there are at least two slots of the type specified and arranged differentially at different distances from the middle of the aeroplane.

8. A structure of the type described in claim 1 in which there are two slots of the type specified one above the other.

9. A structure of the type described in claim 1 in which the slot specified is located in the stabiliser and leads upwardly and forwardly therethrough.

10. A structure of the type described in claim 1 in which the slot specified is located in the stabiliser and leads upwardly and forwardly therethrough with one end of the slot masked by the wing when the stabiliser is in closed position.

11. A structure of the type described in claim 1 in which the slot specified is formed in the stabiliser with its inlet end in the leading edge of the stabiliser and its outlet end open at the top face of the stabiliser.

12. A structure of the type described in claim 1 in which the slot specified is formed in the wing to the rear of the stabiliser with its inlet end opening into the orifice and its outlet end open at the top face of the wing to the rear of the orifice.

13. A structure of the type described in claim 1 in which the slot specified is formed in the wing in front of the stabiliser with one end opening into the orifice and the other end opening to the face of the wing between the orifice and the front edge of the wing.

14. A structure of the type described in claim 1 in which the slot specified is formed in the stabiliser with its inlet end at the front edge of the stabiliser so as to be open to the bottom face of the wing and with its outlet end at the rear edge of the stabiliser so as to be masked by the wing when the stabilizer is closed.

15. A structure of the type described in claim 1 in which there are at least two slots of the type specified located in each of the stabilisers with the slots in each of said stabilisers connected by a passage.

16. A structure of the type described in claim 1 in which the slot specified is located in the wing to the rear of the orifice with its inlet end opening to the orifice so as to be masked by the stabiliser when closed and with its outlet end opening to the face of the wing to the rear of the orifice.

17. A structure of the type described in claim 1 in which the slot specified is located in the wing to the rear of the orifice with its inlet end opening to the orifice so as to be masked by the stabiliser when closed and with its outlet end opening to the rear edge face of the wing.

18. A structure of the type described in claim 1 in which the stabiliser extends underneath the wing at its front edge into substantially lapping relationship with the front portion of the wing and extends above the wing at its rear edge into substantial lapping relationship with the rear portion of the wing.

19. A structure of the type described in claim 1 in which the stabiliser extends underneath a wing portion at its front edge and on top of a wing portion at its rear edge.

20. A structure of the type described in claim 1 in which the top face of the front edge portion and the bottom face of the rear edge portion of the stabiliser are obliquely disposed and in which the front edge portion of the stabiliser extends underneath one wing portion and the rear edge portion of the stabiliser extends on top of another wing portion.

HUBERT LEWELLEN PITT.